United States Patent
Ambrose et al.

[11] Patent Number: 5,924,445
[45] Date of Patent: Jul. 20, 1999

[54] FUEL INTAKE DEVICE FOR FUEL SYSTEMS

[75] Inventors: Gregg J. Ambrose, Meriden; John A. Roncallo, Yalesville, both of Conn.

[73] Assignee: Sikorsky Aircraft Corporation, Stratford, Conn.

[21] Appl. No.: 08/803,337

[22] Filed: Feb. 20, 1997

[51] Int. Cl.$^6$ ............................................. F16K 24/00
[52] U.S. Cl. ..................... 137/549; 137/590; 210/388; 210/416.4
[58] Field of Search ..................... 239/8; 137/549, 137/590; 210/121, 250, 388, 416.4

[56] References Cited

U.S. PATENT DOCUMENTS

| | | | |
|---|---|---|---|
| 4,427,542 | 1/1984 | Glover | 210/121 |
| 4,561,977 | 12/1985 | Sasaki | 210/356 |
| 4,798,330 | 1/1989 | Mancini et al. | 239/8 |
| 5,049,271 | 9/1991 | Cain | 210/250 |
| 5,078,167 | 1/1992 | Brandt et al. | 137/549 |
| 5,390,701 | 2/1995 | Lessley et al. | 137/549 |

*Primary Examiner*—A. Michael Chambers
*Assistant Examiner*—Paul Coryea
*Attorney, Agent, or Firm*—Brian A. Collins

[57] ABSTRACT

A fuel intake device (20) for a fuel system (10) having a fuel tank (14) for containing a supply of fuel (16) and an internal fuel feed line (18) which is disposed internally of the fuel tank (14). The fuel intake device (20) is operative to provide uninterrupted fuel flow in icing conditions and is characterized by a flexible fuel filter (40) having a plurality of primary flow apertures (42) apertures therein for facilitating a primary flow $P_F$ of fuel therethrough, a bypass means (50) for providing a secondary flow $S_F$ of fuel to the internal fuel feed line (18) when an accumulation of ice (80) restricts the primary flow $P_F$ of fuel through the primary flow apertures (42), and force bias means (60) for rapidly reconfiguring the flexible fuel filter (40) for forcibly shedding the accumulation of ice (80), thereby restoring the primary flow $P_F$ of fuel. The flexible fuel filter (40) is reconfigurable from an extended position to a collapsed position in response to a threshold pressure differential across the flexible fuel filter (40). Upon sensing the threshold pressure differential, the bypass means (50) provides a secondary fuel flow $S_F$ which effects a nominal pressure differential across the flexible fuel filter (40). In response to the nominal pressure differential, the force bias means (60) is actuated or released so as to rapidly expand the flexible fuel filter (40).

18 Claims, 6 Drawing Sheets

FUEL INTAKE DEVICE FOR FUEL SYSTEMS

TECHNICAL FIELD

This invention is directed to fuel systems, and, more particularly, to a fuel intake device therefor which is operative to provide uninterrupted fuel flow in the presence of free ice in the fuel supply or in operating conditions which may accrete ice in the fuel system or on components thereof.

BACKGROUND OF THE INVENTION

Depending upon the operational environment of a particular fuel system, certain requirements are imposed on the design thereof for ensuring, inter alia, that fuel is supplied continuously and at a predetermined rate, particulate matter such as ice or debris in the fuel supply is filtered prior to ingestion by the engine, and the spillage of fuel is minimized in an emergency situation. For example, it will be appreciated that fuel systems for aircraft must ensure continuous operation of the fuel system in icing conditions and in the presence of debris in the fuel system. Furthermore, such fuel systems must provide means for mitigating the hazards of fuel spillage in the event of a fuel line rupture, i.e., in a crash or as a result of a ballistic impact.

More specifically, with respect to ice in the fuel supply/ supply lines, the Federal Aviation Administration (FAA) requires that aircraft fuel systems operate in the presence of free water in the fuel supply which, at sub-freezing temperatures, can precipitate out of the fuel and form ice on system components, e.g., inlets, pumps, etc. As such, ice accretion can restrict fuel flow and result in engine "flame-out". Conventionally, this requirement has been addressed by the use of fuel additives, such as ethylene glycol monomethyl ether (also known as Prist® fuel additive produced by PPG Industries, Chemicals Group, located in Pittsburgh Pa.), to abate the formation of ice on system components. While such additives are effective for their intended purpose, the toxicity of such additives is increasingly raising concerns regarding safety, i.e., it has been reported that long-term exposure to such additives may cause health hazards.

With respect to debris or foreign objects which may enter the fuel supply, the FAA also requires that debris be filtered so as to avoid blockage of fuel supply lines or engine flow paths. One prior art system for satisfying this requirement employs filtering apparatus, i.e., screens or strainers, situated downstream of a boost pump disposed internally of the fuel tank. This system, which is a pressurized fuel system, provides a primary flow path through the filter apparatus and a secondary flow path which circumvents the filter apparatus in the event that fuel flow therethrough becomes restricted. More specifically, the secondary flow path includes spring-loaded check valves which open in response to a threshold level of back pressure in the fuel system, thereby facilitating a bypass flow of fuel to the engine.

Disadvantages of pressurized fuel systems relate to the weight and complexity associated with the internal boost pump, e.g., the need to route electrical power into the fuel tank, and the additional weight of bypass fuel lines and check valves. Another disadvantage of pressurized fuel systems relates to the increased potential for fuel discharge in the event of a fuel line rupture. The shortcomings of pressure fuel systems in this regard are discussed below.

With respect to requirements to minimize the discharge of fuel should a crash or other event fracture the fuel line, it is common practice to employ self-sealing break-away valves at various locations in the fuel system. These valves are designed to fracture or break before the failure of other components in the fuel system and immediately seal upon fracture to minimize fuel spillage. Despite this safety feature, ballistic damage or the dynamics of a crash may fracture or sever the fuel line without activating the break-away valves. In such event, pressure fuel systems can continue to pump fuel out of the fuel tank and produce or further aggravate a hazardous condition.

To further enhance system safety, alternative fuel systems have been developed which utilize suction pumps, i.e., rather than boost pumps, to deliver fuel to the engine. The suction pumps are engine driven and disposed externally of the fuel tank. As such, in the event of a fuel line rupture, air is drawn into the fuel system, thereby producing a benign failure mode. While suction fuel systems provide significant advantages in this regard, such systems are highly sensitive to pressure drops in the fuel system. That is, insofar as the maximum pressure differential produced therein is limited by several factors including, the lift and vapor handling capability of the suction pumps, suction fuel systems cannot employ components which produce large pressure drops. For example, suction fuel systems cannot utilize pressure actuated check valves, typically used in pressure systems, to circumvent flow around a filtering apparatus. Furthermore, the prior art suction fuel systems cannot tolerate large pressure drops due to an accumulation of ice on fuel system components. Accordingly, such prior art systems must resort to the use of anti-icing additives and the inherent disadvantages associated therewith.

SUMMARY OF THE INVENTION

It is an object of the present invention to provide a fuel intake device for fuel systems, which fuel intake device is operative to provide uninterrupted fuel flow in the presence of free ice in the fuel supply or in operating conditions which may accrete ice in the fuel system or on components thereof.

It is yet another object of the present invention to eliminate the requirement for anti-icing additives in the fuel supply of such fuel systems.

It is another object of the present invention to provide such a fuel intake device which filters debris from the fuel supply.

It is still another object of the present invention to provide such a fuel intake device which forcibly sheds ice to clear a primary path for fuel flow.

These and other objects are achieved by a fuel intake device for a fuel system having a fuel tank for containing a supply of fuel and an internal fuel feed line which is disposed internally of the fuel tank. The fuel intake device is characterized by a flexible fuel filter having a plurality of primary flow apertures therein for facilitating a primary flow of fuel therethrough, a bypass means for providing a secondary flow $S_F$ of fuel to the internal fuel feed line when an accumulation of ice restricts the primary flow $P_F$ of fuel through the primary flow apertures, and force bias means for rapidly reconfiguring the flexible fuel filter for forcibly shedding the accumulation of ice, thereby restoring the primary flow of fuel. The flexible fuel filter is reconfigurable from an extended position to a collapsed position in response to a threshold pressure differential across the flexible fuel filter. Upon sensing the threshold pressure differential, the bypass means provides the secondary fuel flow which effects a nominal pressure differential across the flexible fuel filter. In response to the nominal pressure differential, the force bias means is actuated or released so as to rapidly expand the flexible fuel filter.

BRIEF DESCRIPTION OF THE DRAWINGS

A more complete understanding of the present invention and the attendant features and advantages thereof may be had by reference to the following detailed description of the invention when considered in conjunction with the following drawings wherein.

BEST MODE FOR CARRYING OUT THE INVENTION

Figure 1:
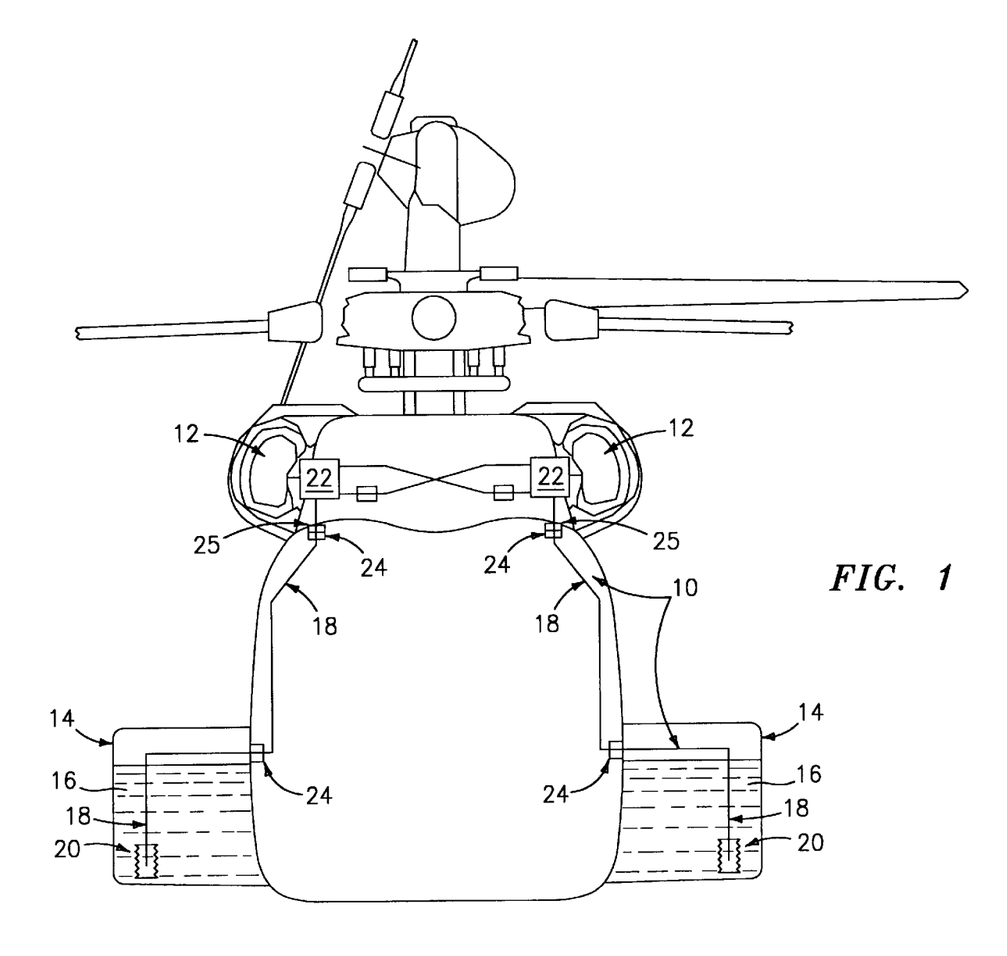
FIG. 1 is a schematic view of a helicopter fuel system employing a fuel intake device according to the present invention.

Referring now to the drawings wherein like reference characters identify corresponding or similar elements throughout the several views, FIG. 1 shows a simplified schematic view of a fuel system 10 for a helicopter including multiple gas turbine engines 12, fuel containing tanks 14 for storing a supply of fuel 16, fuel feed lines 18 extending from each fuel tank 14 and cross-feeding the gas turbine engines 12, and a fuel intake device 20 according to the present invention disposed internally of each fuel tank 14 for drawing fuel 16 therefrom. The fuel system 10 also includes suction pumps 22 for delivering fuel 16 to the engines 12 and break-away valves 24 disposed at or near the junction of each fuel feed line 18 and the respective fuel tank 14 or an upper deck structure 25 of the helicopter. As discussed in the Background of the Invention, the combination of suction pumps 22 and break-away valves 24 greatly reduces fuel spillage in the event of a fuel line rupture and enhances the safety and crashworthiness of the fuel system 10.

In the described embodiment, the fuel supply 16 is not protected by anti-icing additives, hence free-water in the fuel supply 16 may, if the temperature thereof is subfreezing, develop into ice and form on fuel system components. Such fuel system conditions will hereinafter be referred to as an "icing condition".

Figure 2:
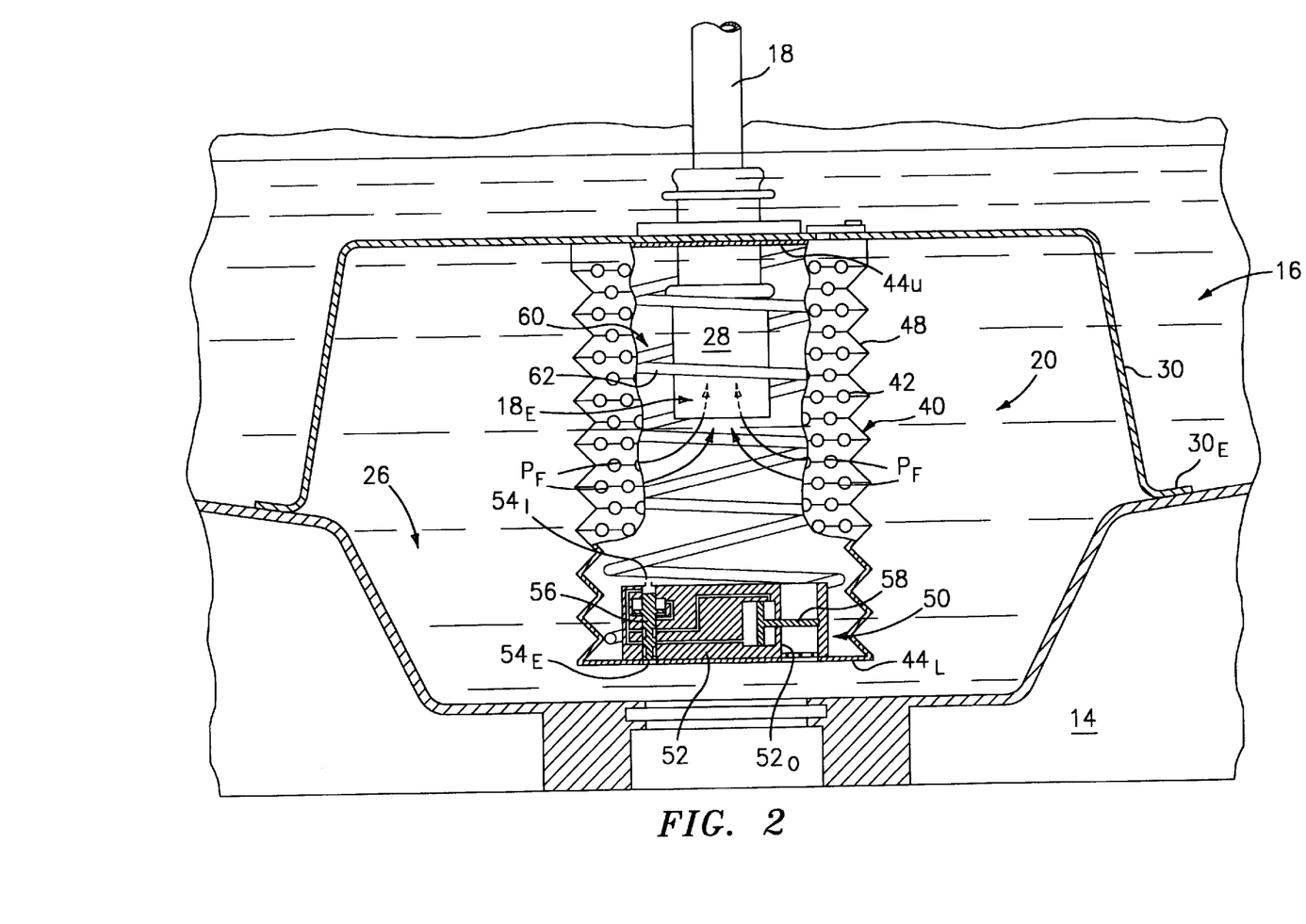
FIG. 2 is a partially broken-away and sectioned side view of the fuel intake device disposed within a fuel containing tank, which fuel intake device includes a flexible fuel filter having primary flow apertures for facilitating a primary flow of fuel, a bypass means having a secondary flow aperture for facilitating a secondary flow of fuel when an accumulation of ice restricts the primary fuel flow, and a force bias means for rapidly reconfiguring the flexible fuel filter for forcibly shedding ice therefrom.

In FIG. 2, an enlarged view of an exemplary fuel intake device 20 is shown wherein the respective fuel feed line 18 is disposed internally of the fuel tank 14 (hereinafter referred to as the "internal fuel feed line") and wherein an end portion $18_E$ of the internal fuel feed line 18 is proximal to or extends into a sump region 26 of the fuel tank 14. The sump region 26 is a low point in the fuel tank 14 where fuel, ice, and debris will gravitate and contains a volume of fuel which is at least about 0.1% of the total volume or fuel carrying capacity of the fuel tank 14. In the described embodiment of the invention, the internal fuel feed line 18 optionally includes an Engine Feed Inlet (EFI) check valve 28 for preventing back-flow of fuel 16 into the fuel tank 14 when the engines are shut-down. As such, the EFI check valve 28 ensures that the fuel system remains "primed" or ready for engine start-up.

The internal fuel feed line 18 is supported by means of a bridge structure 30 which mounts at each end $30_E$ thereof to the lower surface of the fuel tank 14. As such, the bridge structure 30 inhibits lateral motion of the internal fuel feed line 18 which may occur due to agitation or "slosh" of the fuel supply 16. In the described embodiment, agitation of the fuel supply 16 occurs in response to helicopter attitude changes, however, it will be appreciated that other fuel system applications will not produce significant fuel movement and, accordingly, may forego the need for such bridge structure 30. That is, the inherent rigidity of the internal fuel feed line 18 may be sufficient to maintain its spatial position within the fuel tank 14.

The fuel intake device 20 comprises a flexible fuel filter 40 for providing a primary flow of fuel, bypass means 50 for providing a secondary flow of fuel in the event that ice accretion restricts the primary fuel flow, and force bias means 60 for rapidly reconfiguring the flexible fuel filter 40 so as to forcibly shed ice therefrom. Before discussing the functional interaction of the various elements, a brief description of the structural and functional characteristics of each will be provided.

The flexible fuel filter 40 is disposed in combination with the end portion $18_E$ of the internal fuel feed line 18 and includes a plurality of primary flow apertures 42 for facilitating the primary fuel flow to the internal fuel feed line 18. The cumulative flow area defined by the primary flow apertures 42 is about five times the flow area of the internal fuel feed line 18 and the maximum opening of each primary flow aperture 42 is about 0.050 inches to about 0.120 inches, which opening is suitable for filtering debris from the primary fuel flow.

In the described embodiment, the flexible fuel filter 40 is generally cylindrical in shape and comprises an upper end portion $44_U$ disposed in sealed combination with the internal fuel feed line 18, a lower end portion $44_L$, and a deformable center body 48 disposed between the upper and lower end portions $44_U$, $44_L$. The deformable center body 48 is preferably a flexible metallic bellows which is operative to collapse and extend in response to the dynamic pressure of the fuel flowing across the flexible fuel filter 40, through the primary flow apertures 42. In the preferred embodiment, the flexible fuel filter 40 is designed to collapse to about ½ of its fully-extended position under a fuel system suction load of about 2.0 lbs/in².

The bypass means 50 is disposed in fluid communication with the fuel feed line 18 and functions to provide a bypass or secondary flow of fuel to the fuel system. In the described embodiment, the bypass means 50 is disposed in combination with the lower end portion $44_L$ of the flexible fuel filter 40 and comprises a pressure-actuated valve 52 having internal and external pressure sensing ports $54_I$ and $54_E$, respectively, for sensing the pressure differential across the flexible fuel filter 40. More specifically, a spring-loaded vacuum-operated spool valve 56 is disposed in fluid communication with the pressure sensing portions $54_I$, $54_E$ and translates within its bore in response to sensed values of pressure differential. Upon sensing a threshold pressure differential, the spool valve 56 operates to port vacuum pressure to a piston- or diaphragm-actuated gate valve 58 which is operative to open or close a secondary flow aperture $52_O$. Moreover, the pressure-actuated valve 52 operates in a digital fashion such that the gate valve 58 is fully-open when the pressure differential is equal to or greater than the threshold pressure differential and is fully-closed when the pressure differential is less than the threshold pressure differential. Pressure actuated valves of the type described are available from Parker Motion and Control, located in Elyria, Ohio.

The force bias means 60 is disposed in combination with the flexible fuel filter 40, and, in the broadest sense of the invention, is any device which is capable of rapidly reconfiguring the flexible fuel filter 40 from a collapsed position to an extended position. As will be discussed in greater detail hereinbelow, the force bias means 60 is responsive to a precipitous reduction in pressure differential across the flexible fuel filter 40, i.e., from the threshold pressure differential to a nominal pressure differential. In the described embodiment, the force bias means 60 comprises an internal coil spring 62 disposed between the upper and lower end portions $44_U$, $44_L$ of the flexible fuel filter 40, which coil spring 62 biases the flexible fuel filter 40 to a fully-extended position.

Figure 3:
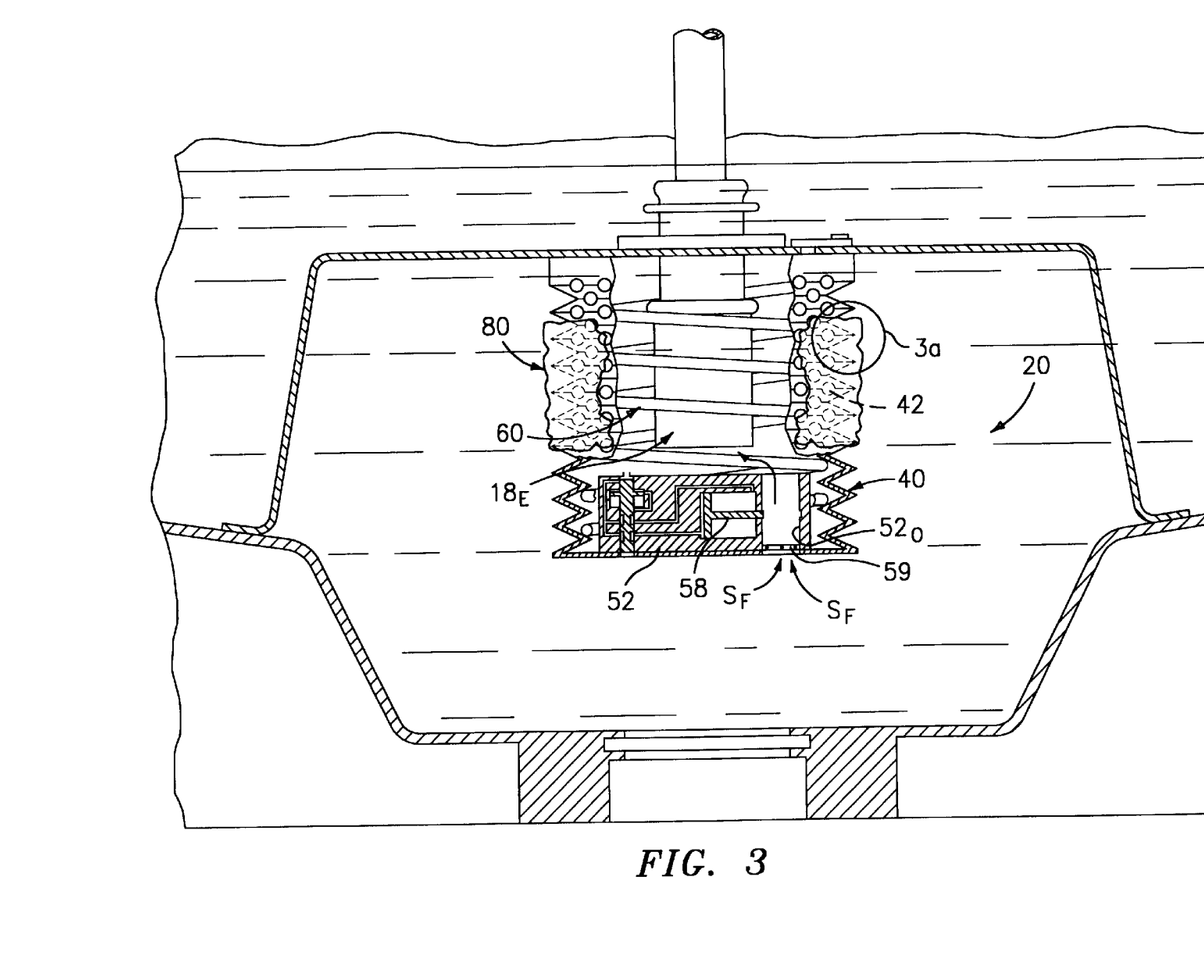
FIG. 3 is a partially broken-away and sectioned side view of the fuel intake device wherein the flexible fuel filter is shown in a collapsed position due to an accumulation of ice which has formed on the exterior surface of the flexible fuel filter and wherein the bypass means has been activated for facilitating the secondary fuel flow.
Figure 4:
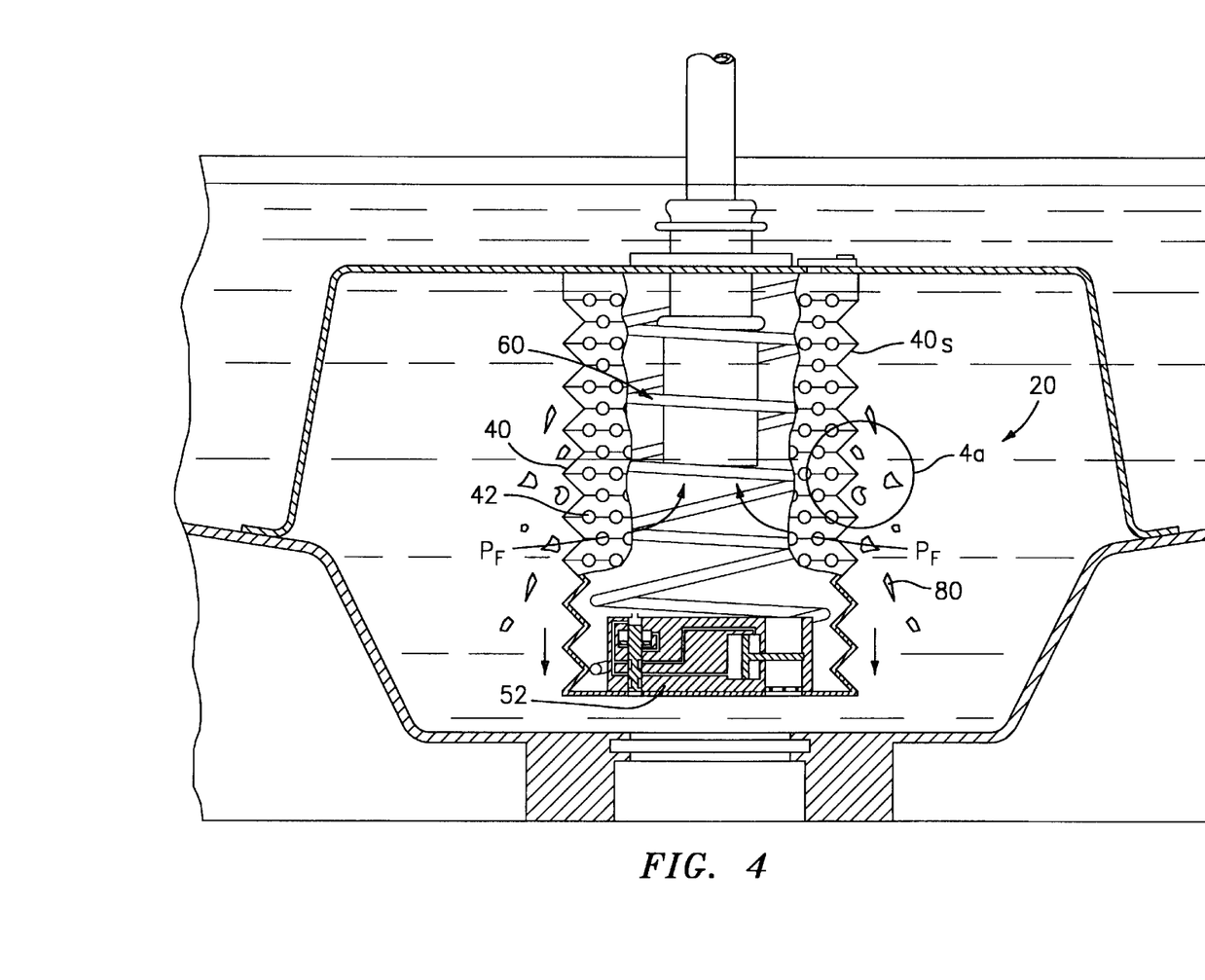
FIG. 4 is a partially broken-away and sectioned side view of the fuel intake device wherein the force bias means has been activated to forcibly shed ice from the flexible fuel filter.

In FIGS. 2, 3 and 4, the fuel intake device 20 is shown in various operating conditions and/or positions. More specifically, in FIG. 2, the fuel intake device 20 is operating a normal condition wherein ice has not developed or accumulated on any fuel system component. Suction developed in the fuel feed line 18 produces a pressure differential across the flexible fuel filter 40 thereby drawing a primary flow of fuel $P_F$ through the primary flow apertures 42 thereof. In this operating condition, the flexible fuel filter 40 facilitates the primary fuel flow $P_F$ while, furthermore, filtering debris from the fuel supply 16.

In FIG. 3, the fuel intake device 20 is shown in an icing condition wherein an accumulation of ice 80 has formed on the flexible fuel filter 40 thereby restricting fuel flow through the primary flow apertures 42. The restricted fuel flow increases the pressure differential so as to slowly deform the flexible fuel filter 40 to a collapsed position. During this gradual process of ice accretion and deformation of the flexible fuel filter 40, energy is stored via the force bias means 60. When the pressure differential has reached the threshold pressure differential, the pressure-actuated valve 52 opens to permit a secondary flow $S_F$ of fuel through the secondary aperture $52_O$ of the pressure actuated valve 52. While the magnitude of the threshold pressure differential for actuating the valve 52 will vary depending upon such factors as the stiffness of the flexible fuel filter 40, the size of the primary flow apertures 42, the suction loads produced by the fuel system etc., the magnitude of the threshold pressure differential is about 1.5 lbs/in$^2$ to about 2.5 lbs/in$^2$ for the described embodiment.

To avoid infiltration of large particles of debris which may be damaging to the engine, it may be desirable to include a course screening material 59 to filter the secondary fuel flow $S_F$. Furthermore, the course screening material 59 and the size of the secondary flow aperture $52_O$ is selected to fully accommodate the flow requirements of the fuel system 10 without significant flow restriction. As such, and referring to FIG. 4, the pressure differential across the flexible fuel filter 40 drops precipitously from the threshold pressure differential to the nominal pressure differential. Accordingly, the energy stored via the force bias means 60 is released thereby causing the flexible fuel filter 40 to rapidly expand to its original extended position. In the described embodiment, the force bias means 60 is caused to actuate when the pressure differential drops, i.e., from the threshold pressure differential to the nominal pressure differential, by about 1.0 lbs/in$^2$.

Figure 3A:
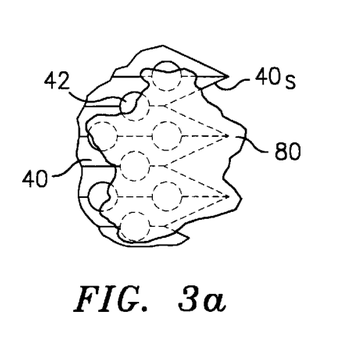
FIG. 3a is an enlarged view of the flexible fuel filter shown in FIG. 3.
Figure 4A:
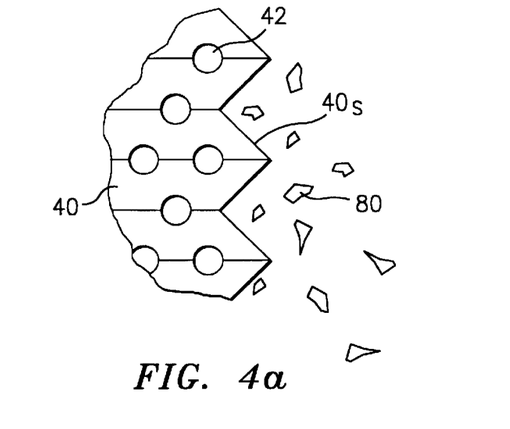
FIG. 4a is an enlarged view of the flexible fuel filter shown in FIG. 4.

In the course of such extension, and referring to FIGS. 3, 3a and 4a, the accretion of ice 80 is forcibly shed from the exterior surface $40_S$ of the flexible fuel filter 40, thereby dislodging ice 80 from the primary flow apertures 42. Consequently, the pressure-actuated valve 52, which senses a reduced pressure differential across the flexible fuel filter 40, closes, and the primary fuel flow $P_F$ is restored. This sequence of operation will repeat as often as may be necessary until icing conditions have subsided.

Figure 5:
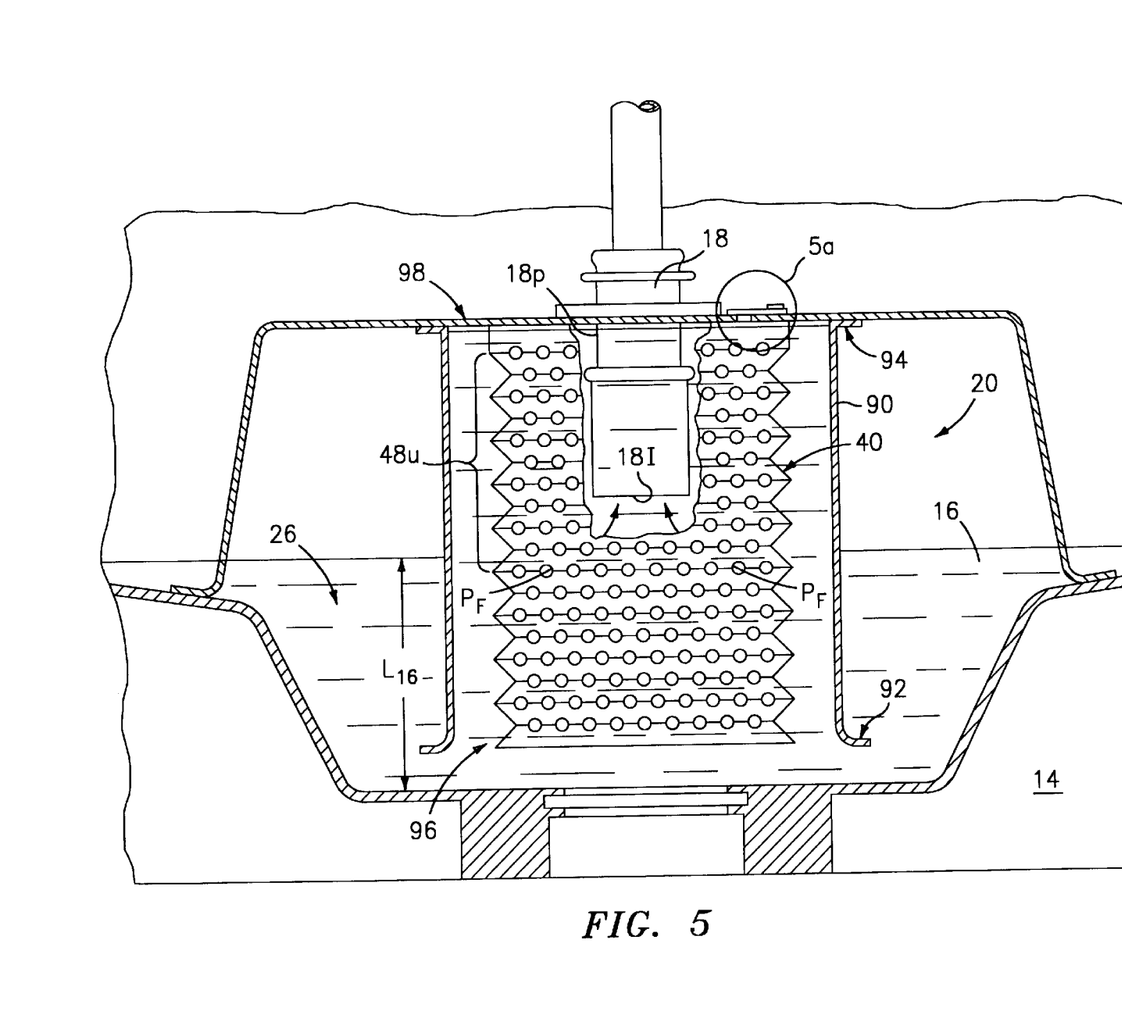
FIG. 5 depicts a an alternate embodiment of the fuel intake device wherein a shroud member entrains a flow of fuel from a sump region of the fuel tank.

In FIG. 5, the fuel intake device 20 may optionally include a shroud member 90 disposed about the flexible fuel filter 40 for drawing fuel from the lowest practicable point in the sump region 26 of the fuel tank 14. More specifically, the shroud member 90 is disposed about the filter assembly 40 and includes a lower end portion 92 extending into the sump region 26 and an upper end portion 94 disposed in sealed combination with the internal fuel feed line 18. More specifically, the lower end portion 92 of the shroud member 90 defines an opening 96 for facilitating fuel flow to the flexible fuel filter 40, and the upper end portion 94 is directly or indirectly sealed to the external periphery $18_P$ of the internal fuel feed line 18. Regarding the latter, sealing of the shroud member 90 to the internal fuel feed line 18 may include any sealing arrangement known in the art and will depend upon the geometric configuration of the shroud 90. In the described embodiment, the bridge assembly 30 forms an upper end cap 98 of the shroud member 90 which is sealed to the internal fuel feed line 18. For applications wherein a bridge assembly 30 is not required, the shroud member 90 may be configured such that the upper end thereof directly adjoins the external periphery $18_P$ of the internal fuel feed line 18 and is bonded, welded or otherwise sealed thereto.

The importance of the shroud member 90 is most apparent when considering an operating condition wherein the fuel level $L_{16}$ is low relative to the inlet $18_I$ of the internal fuel feed line 18. As such, the shroud member 90, which is disposed in sealed combination with the internal fuel feed line 18, entrains the fuel flow from the sump region 26 to the uppermost portion $48_U$ of the flexible fuel filter 40. Accordingly, the shroud member 90 may be viewed as an extension of the internal fuel feed line 18, which shroud member 90 draws fuel from the lowest practical level of the fuel tank 14 and maximizes the useable fuel in the fuel tank 14. It will be appreciated that without the shroud member 90, the fuel supply 16 would essentially be cut-off when the fuel level $L_{16}$ falls below the inlet $18_I$. Accordingly, this volume of fuel would be unavailable for use and, with respect to a helicopter, would reduce the helicopter's range of flight.

Figure 5A:
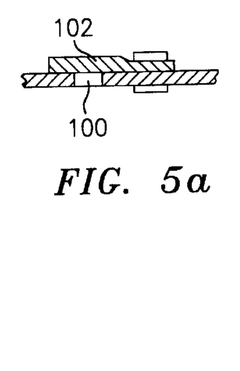
FIG. 5a is an enlarged view of an upper portion of the fuel intake device wherein a vent aperture is provided therein for venting entrapped air or fuel vapor from the shroud member.

While the shroud member 90 maximizes the useable fuel supply, a practical concern relates to the possible entrapment of air or fuel vapor upon refueling. While various methods may be employed to remove such gases, the fuel intake device 20 may include an aperture 100 (see FIG. 5a) for venting the upper portion of the shroud member 90 and a flapper check valve 102 disposed over the aperture 100. As such, upon refueling, any entrapped gases may escape through the vent aperture 100 as the fuel level rises in the tank. In use, i.e., when the shroud member 90 entrains fuel in the bypass operating mode, the flapper valve 102 seals the aperture 100 so as to enable a negative pressure or vacuum to develop in the shroud member 90.

Figure 6A:
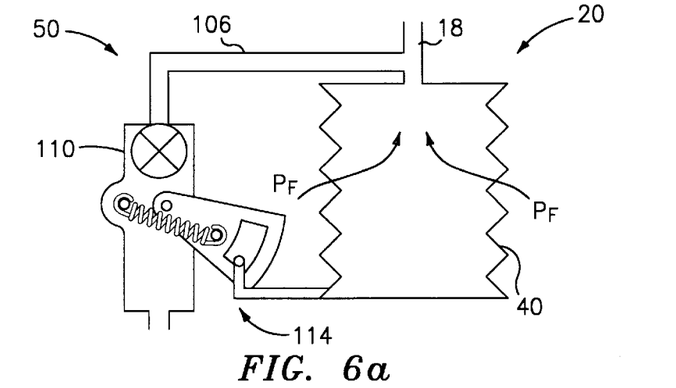
FIGS. 6a–6c depict an alternate embodiment of the invention wherein the bypass means establishes a parallel flow path which is separate and distinct from the flow path through the flexible fuel filter.
Figure 6B:
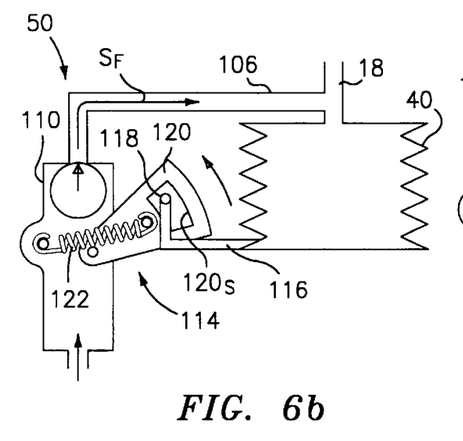
Figure 6C:
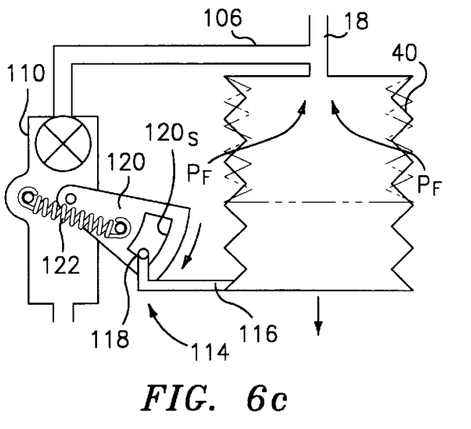

In FIGS. 6a–6c, an alternate embodiment of the fuel intake device 20 is schematically shown wherein the bypass means 50 includes a secondary flow tube 106 disposed in fluid communication with the fuel feed line 18 at a point above the flexible fuel filter 40, a mechanically-actuated bypass valve 110 for facilitating the secondary fuel flow $S_F$ through the tube 106, and a mechanical linkage arrangement 114 for opening and closing the bypass valve 110 in response to the displacement of the flexible fuel filter 40. More specifically, and referring to FIGS. 6b and 6c, the linkage arrangement 114 includes a laterally protruding arm 116 mounted at one end to the flexible fuel filter 40 and having a drive pin 118 at the other end, a link 120 pivotably mounted to a rotating valve element (not shown) at one end and having a slot 120s formed therein for accepting the drive pin 118, and an over-center spring 122 for driving rotation of the valve element in a clockwise or counterclockwise direction once the link 118 has passed an "over-center condition". In operation, the threshold pressure differential effects collapse of the flexible fuel filter 40 (FIG. 6b) such that the arm 116 drives the link 118 in a counterclockwise direction passed its over-center condition. As such, the mechanically-actuated valve 110 is opened thereby facilitating the secondary fuel flow $S_F$.

The sudden loss of dynamic pressure, i.e., drop in pressure differential, causes the force bias means (not shown) to rapidly expand the flexible fuel filter 40 (FIG. 6c) to forcibly shed ice therefrom. Furthermore, the displacement effected by the expansion causes the arm 116 to drive the link 120 in a clockwise direction, thereby closing the mechanically-actuated valve 110.

Although the invention has been shown and described with respect to exemplary embodiments thereof, it should be understood by those skilled in the art that other changes, omissions and additions may be made therein and thereto, without departing from the spirit and scope of the present invention. For example, while the exemplary embodiments of the fuel intake device 20 employ a deformable center body 48 fabricated from a flexible metallic bellows, it should be appreciated that any deformable material having elastic properties may be used such as a wire mesh screening material. Furthermore, while the described embodiment depicts a shroud member 90 for entraining fuel from the sump region 26 of the fuel tank 14, it will be appreciated that the fuel tank 14 may be reconfigured such that the shape of the fuel tank sump closely corresponds to the shape of the flexible fuel filter 40 thereby eliminating the need for the shroud 90. Moreover, while the fuel intake device 20 is described in terms of a force bias means 60 comprising a coil spring 62, it will be appreciated that any means for rapidly extending the flexible fuel filter 40 in response to a sudden drop in pressure differential may be employed. For example, the metallic bellows may be structurally designed to produce the desired spring rate without the need for spring rate augmentation or a separate device to effect rapid extension of the flexible fuel filter 40.

In summary, the fuel intake device 20 of the present invention filters debris from the fuel supply during normal operating conditions and provides uninterrupted fuel flow in icing conditions. Accordingly, the fuel intake device 20 obviates the requirements for anti-icing additives and the inherent disadvantages thereof. Furthermore, the fuel intake device 20 is self-deicing and operates independently without the need for a source of external power. Finally, the use of a shroud member 90 maximizes the useable fuel supply in the fuel tank.

What is claimed is:

1. A fuel intake device (20) for a fuel system (10), the fuel system (20) having a fuel tank (14) for containing a supply of fuel (16) and an internal fuel feed line (18), the fuel intake device (20) being characterized by:

a flexible fuel filter (40) enveloping an end portion ($18_E$) of the internal fuel feed line (18) and having a plurality of primary flow apertures (42) apertures therein for facilitating a primary flow $P_F$ of fuel (16) therethrough, said flexible fuel filter (40) being reconfigurable from an extended position to a collapsed position in response to a threshold pressure differential across said flexible fuel filter (40);

bypass means (50), responsive to said threshold pressure differential, for providing a secondary flow $S_F$ of fuel (16) to said internal fuel feed line (18) when an accumulation of ice (80) restricts said primary flow $P_F$ of fuel through said primary flow apertures (42), said secondary flow $S_F$ of fuel (16), furthermore, effecting a nominal pressure differential across said flexible fuel filter (40);

force bias means (60), responsive to said nominal pressure differential, for rapidly reconfiguring said flexible fuel filter (40) from said collapsed position to said extended position for forcibly shedding said accumulation of ice (80), thereby restoring said primary flow $P_F$ through said primary flow apertures (42).

2. The fuel intake device (20) according to claim 1 wherein said bypass means (50) includes a pressure-actuated bypass valve (52) disposed in combination with said flexible fuel filter (40), said pressure-actuated valve (52) providing said secondary fuel flow $S_F$ to said internal fuel feed line (18) through said flexible fuel filter (40).

3. The fuel intake device according to claim 1 wherein said bypass means (50) includes a secondary flow tube (106) disposed in fluid communication with the fuel feed line (18), a mechanically-actuated bypass valve (110) for providing the secondary fuel flow $S_F$ through the tube (106), and a mechanical linkage arrangement (114) for alternately opening and closing the bypass valve (110) in response to displacement of the flexible fuel filter (40).

4. The fuel intake device (20) according to claim 1 wherein said flexible fuel filter (40) is a flexible metallic bellows (42).

5. The fuel intake device (20) according to claim 1 wherein said force bias means (60) includes a coil spring (62) disposed between an upper and lower portion ($44_U$, $44_L$) of said flexible fuel filter (40).

6. The fuel intake device (20) according to claim 1 wherein said force bias means (60) is defined by a characteristic spring rate of said flexible fuel filter (40).

7. The fuel intake device (20) according to claim 1 further characterized by a shroud member (90) disposed about the flexible fuel filter (40), said shroud member (90) including a lower end portion (92) extending into a sump region (26) of the fuel tank (14) and an upper end portion (94) disposed in sealed combination with the internal fuel feed line (18), said lower end portion (92) defining an opening for facilitating fuel flow to the flexible fuel filter (40).

8. The fuel intake device (20) according to claim 1 wherein the threshold pressure differential is between about 1.5 lbs/in$^2$ to about 2.5 lbs/in$^2$, wherein said nominal pressure differential is at least 1.0 lbs/in$^2$ less than said threshold pressure differential.

9. The fuel intake device (20) according to claim 2 wherein said flexible fuel filter (40) is a flexible metallic bellows (42).

10. The fuel intake device (20) according to claim 2 wherein said force bias means (60) includes a coil spring (62) disposed between an upper and lower portion ($44_U$, $44_L$) of said flexible fuel filter (40).

11. The fuel intake device (20) according to claim 2 wherein said force bias means (60) is defined by a characteristic spring rate of said flexible fuel filter (40).

12. The fuel intake device (20) according to claim 2 further characterized by a shroud member (90) disposed about the flexible fuel filter (40), said shroud member (90) including a lower end portion (92) extending into a sump region (26) of the fuel tank (14) and an upper end portion (94) disposed in sealed combination with the internal fuel feed line (18), said lower end portion (92) defining an opening for facilitating fuel flow to the flexible fuel filter (40).

13. The fuel intake device (20) according to claim 2 wherein the threshold pressure differential is between about 1.5 lbs/in$^2$ to about 2.5 lbs/in$^2$, wherein said nominal pressure differential is at least 1.0 lbs/in$^2$ less than said threshold pressure differential.

14. The fuel intake device (20) according to claim 3 wherein said flexible fuel filter (40) is a flexible metallic bellows (42).

15. The fuel intake device (20) according to claim 3 wherein said force bias means (60) includes a coil spring (62) disposed between an upper and lower portion ($44_U$, $44_L$) of said flexible fuel filter (40).

16. The fuel intake device (20) according to claim 3 wherein said force bias means (60) is defined by a characteristic spring rate of said flexible fuel filter (40).

17. The fuel intake device (20) according to claim 3 further characterized by a shroud member (90) disposed about the flexible fuel filter (40), said shroud member (90) including a lower end portion (92) extending into a sump region (26) of the fuel tank (14) and an upper end portion (94) disposed in sealed combination with the internal fuel feed line (18), said lower end portion (92) defining an opening for facilitating fuel flow to the flexible fuel filter (40).

18. The fuel intake device (20) according to claim 3 wherein the threshold pressure differential is between about 1.5 lbs/in$^2$ to about 2.5 lbs/in$^2$, wherein said nominal pressure differential is at least 1.0 lbs/in$^2$ less than said threshold pressure differential.

* * * * *